US012646914B2

(12) United States Patent
Pandey

(10) Patent No.: US 12,646,914 B2
(45) Date of Patent: Jun. 2, 2026

(54) HYBRID EMT COUPLING

(71) Applicant: Eaton Intelligent Power Limited, Dublin (IE)

(72) Inventor: Prince Kumar Pandey, Bhagalpur (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 106 days.

(21) Appl. No.: 18/423,856

(22) Filed: Jan. 26, 2024

(65) Prior Publication Data
US 2024/0258776 A1 Aug. 1, 2024

(30) Foreign Application Priority Data
Jan. 31, 2023 (IN) .............................. 202311006103

(51) Int. Cl.
*H02G 3/00* (2006.01)
*H02G 3/06* (2006.01)

(52) U.S. Cl.
CPC ..................................... *H02G 3/06* (2013.01)

(58) Field of Classification Search
CPC ........................................................ H02G 3/06
See application file for complete search history.

(56) References Cited

U.S. PATENT DOCUMENTS

| | | | |
|---|---|---|---|
| 5,799,984 A * | 9/1998 | Reynolds, Jr. .......... | F16L 21/08 285/317 |
| 10,056,746 B1 | 8/2018 | Smith | |
| 2012/0086196 A1* | 4/2012 | Smith ..................... | H02G 3/06 285/31 |

* cited by examiner

*Primary Examiner* — Pete T Lee
(74) *Attorney, Agent, or Firm* — Stinson LLP

(57) ABSTRACT

A coupling for coupling distal ends of two electrical conduits together includes a body. The body includes an annular wall defining an internal cavity of the coupling. An opening of the coupling extends through the annular wall, and a first tab projects into the opening. The first tab is deformable between a first state and a second state.

20 Claims, 10 Drawing Sheets

HYBRID EMT COUPLING

CROSS REFERENCE TO RELATED APPLICATIONS

This application claims benefit of and priority to Indian Patent Application No. 202311006103, filed Jan. 31, 2023, entitled "HYBRID EMT COUPLING," which is incorporated herein in its entirety.

FIELD

The present invention relates to a coupling for connecting two conduits to each other, and more specifically, a coupling including an internal stop and viewing window for viewing distal ends of the conduits.

BACKGROUND

Electrical conduits (e.g., EMT conduits or rigid pipe for enclosing wires) are generally coupled with a coupling that defines an internal cavity dimensioned to receive opposing ends of the conduits. Many couplings include a stopper that protrudes into the cavity from an inner wall thereof. The stopper is adapted to contact the opposing conduit ends to ensure they are properly aligned before fastening the coupling thereto. Some couplings define a window (e.g., a stamped cut-out) that allows the user to see into the cavity to confirm this alignment. But in existing couplings, the stopper (which protrudes into the cavity) prevents the user from extending the conduit therethrough. Thus, it is desirable to have a coupling that obviates the foregoing issue.

BRIEF SUMMARY

The following presents a simplified summary of the disclosure in order to provide a basic understanding of some example aspects described in the detailed description. This summary is not an extensive overview. Moreover, this summary is not intended to identify critical elements of the disclosure nor delineate the scope of the disclosure. The sole purpose of the summary is to present some concepts in simplified form as a prelude to the more detailed description that is presented later.

In accordance with a first aspect, a coupling is provided for coupling distal ends of two electrical conduits together. The coupling includes a body with an annular wall that defines an internal cavity. An opening extends through the annular wall, and a first tab projects into the opening. The first tab is adapted to deform between a first state and a second state.

In accordance with another aspect, the body extends along a longitudinal axis. The first tab includes a first edge extending in a direction substantially perpendicular to the longitudinal axis, a second edge substantially parallel to the longitudinal axis, and a third edge substantially parallel to the longitudinal axis. The annular wall and the first edge define a gap therebetween.

In accordance with another aspect, the body extends along a longitudinal axis. The first tab includes a first edge extending in a direction substantially parallel to the longitudinal axis, a second edge substantially perpendicular to the longitudinal axis, and a third edge substantially perpendicular to the longitudinal axis. The annular wall and the first edge define a gap therebetween.

In accordance with another aspect, the annular wall and the second and third edges respectively define viewing windows of the coupling.

In accordance with another aspect, the coupling further comprises a plurality of bosses disposed on the annular wall, each boss defining a threaded opening, and a plurality of fasteners each rotatably engaged with the threaded opening of each of the plurality of bosses, respectively, each fastener being extendable into the internal cavity.

In accordance with another aspect, the coupling includes a second tab projecting into the opening, said second tab being deformable from a first state to a second state.

In accordance with another aspect, the first tab and the second tab each define a cutout for engagement with a tool.

In accordance with another aspect, a method for coupling distal ends of electrical conduits together includes providing the coupling, a first conduit, and a second conduit, and deforming the first tab of the coupling to the second state. The method also includes inserting a distal end of the first conduit into the internal cavity of the coupling such that the distal end is brought into engagement with the first tab, and inserting a distal end of the second conduit into the internal cavity such that the distal end is brought into engagement with the first tab.

In accordance with another aspect, the method further comprises securing the coupling to the conduits via removable fasteners.

In accordance with another aspect, the method further comprises inserting a distal end of a tool at an acute angle relative to the first tab into the opening, and pivoting the tool to deform the first tab from the first state to the second state, wherein in the second state the first tab is bent inwards into the internal cavity of the body.

In accordance with another aspect, the method further comprises removing the conduits from the internal cavity and deforming the first tab from the second state to the first state, wherein in the first state the first tab is parallel with the annular wall of the body.

In accordance with another aspect, the method further comprises inserting a distal end of a tool at an acute angle relative to the annular wall into the opening, and pivoting the tool to deform the first tab from the second state to the first state, wherein in the second state the first tab is bent inwards into the internal cavity of the body.

In accordance with another aspect, the method further comprises sliding the first conduit through the internal cavity before deforming the tab to the second state.

In accordance with another aspect, a method for coupling electric conduits includes providing a coupling defining an internal cavity and an opening extending through a wall of the coupling. The coupling includes a first tab and a second tab extending into the opening from opposing sides thereof, the first and second tabs being deformable from a first state to a second state. The method also includes providing a first conduit and a second conduit and deforming each of the first and second tabs from the first state to the second state. Thereafter, the method includes inserting an end of a first conduit in the internal cavity such that the end is brought into engagement with one of the first or second tabs, and inserting an end of a second conduit in the internal cavity such that the end is brought into engagement with another of the first or second tabs.

In accordance with another aspect, the method further comprises securing the coupling to the conduits via removable fasteners.

DETAILED DESCRIPTION

Figure 1:
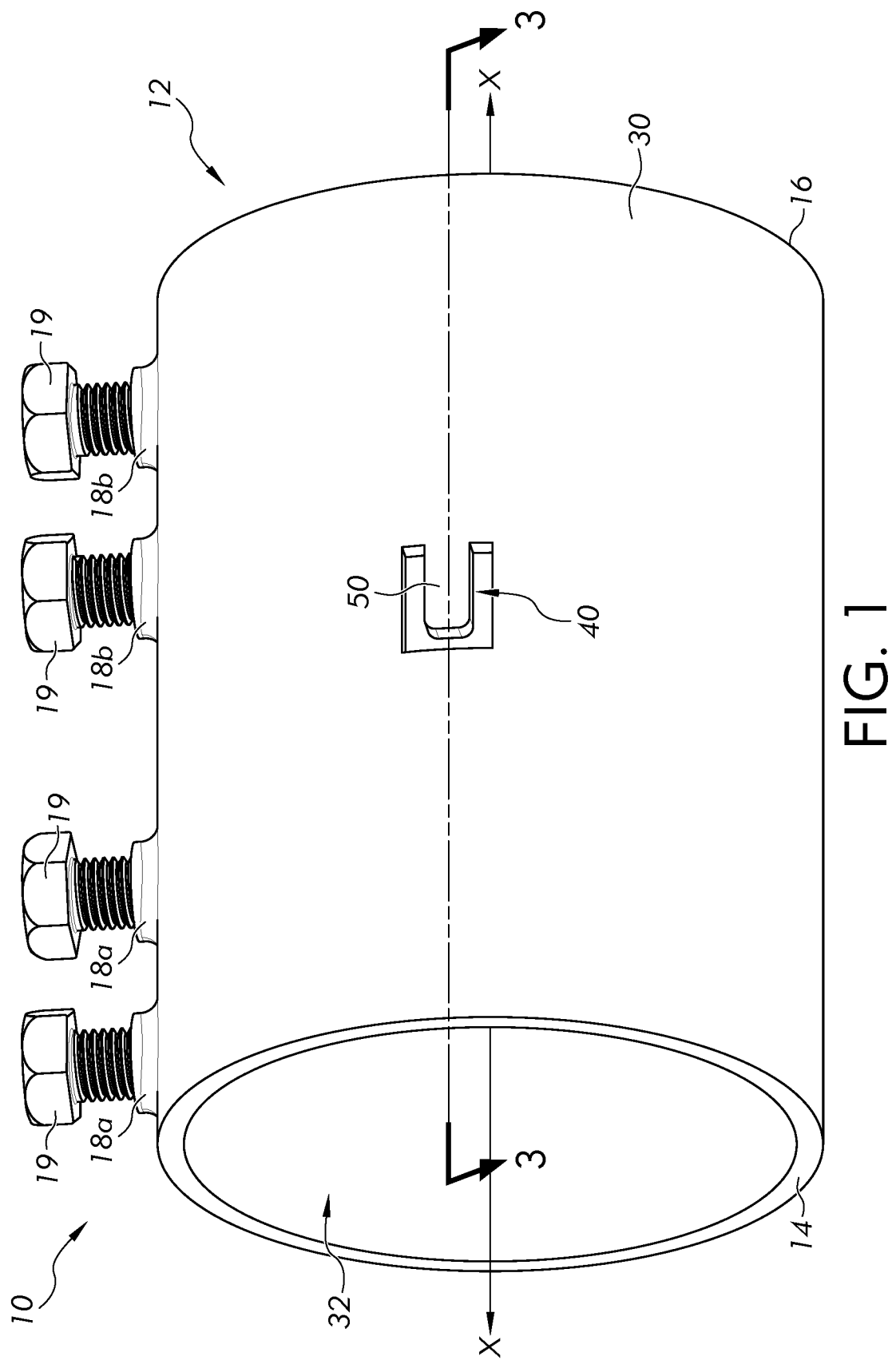
FIG. 1 is a perspective view of a coupling according to a first embodiment.

The present apparatus will now be described more fully hereinafter with reference to the accompanying drawings in which embodiments of the disclosure are shown. Whenever possible, the same reference numerals are used throughout the drawings to refer to the same or like parts. However, this disclosure may be embodied in many different forms and should not be construed as limited to the embodiments set forth herein.

Herein, the terms "substantially," "about," and variations thereof are intended to denote that the described features are equal or approximately equal to a value or characteristic, as desired, reflecting tolerances, conversion factors, rounding off, measurement error and the like, and other factors. For example, the term "substantially perpendicular" is intended to denote an orientation that is perpendicular or approximately perpendicular. As another example, the terms "substantially," "about," and variations thereof can denote values or characteristics that are exact or within 10% of exact, for example within 5% of exact, or within 2% of exact.

Figure 2:
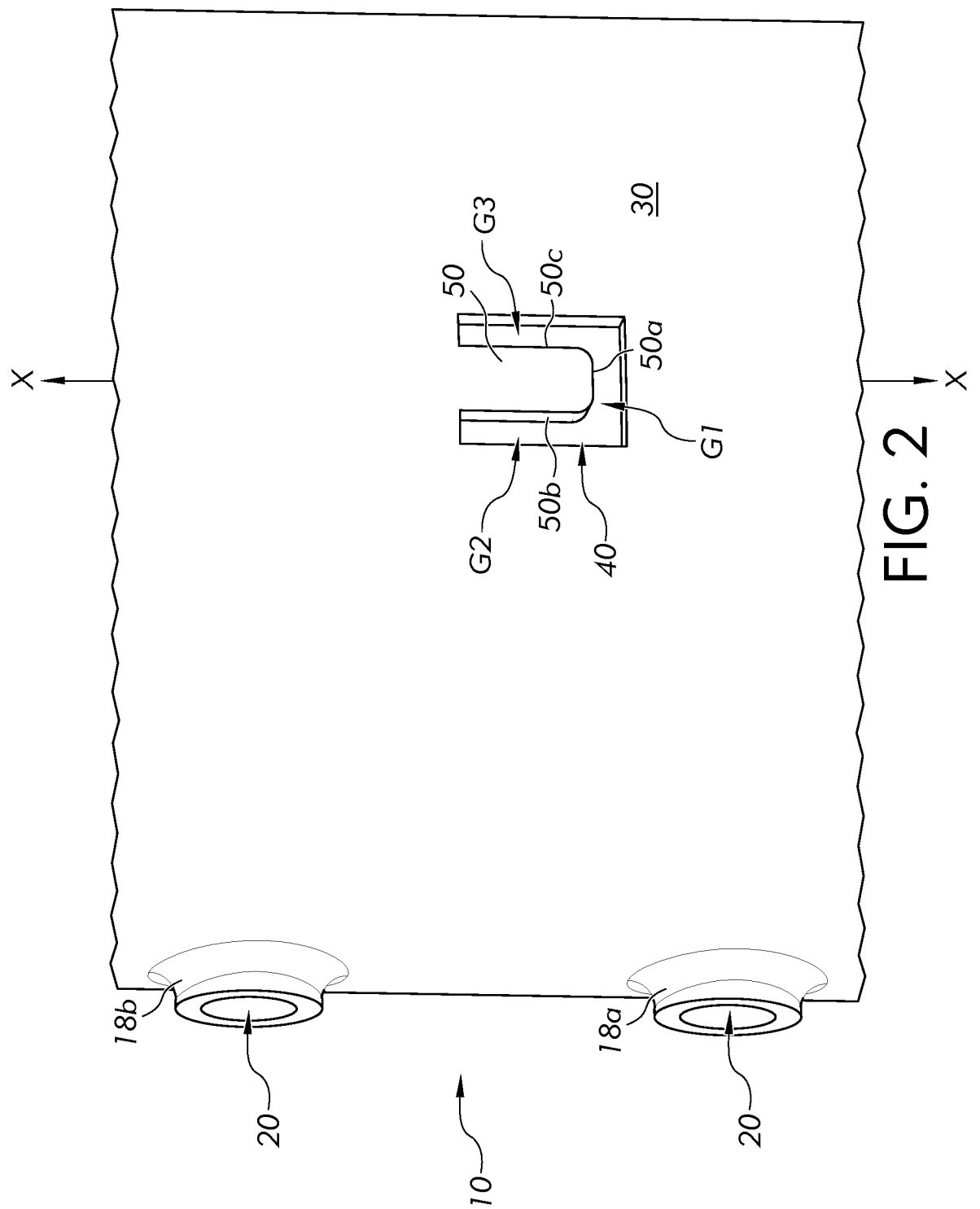
FIG. 2 is an enlarged view of a tab of the coupling of FIG. 1.

Referring now to FIGS. 1 and 2, a coupling 10 for coupling electric conduits together, according to a first embodiment is shown. The coupling 10 includes a body 12 that extends longitudinally along an axis x between a first end 14 and a second end 16 thereof. The body 12 is generally a cylindrical-shaped element made of a rigid material (e.g., steel, zinc, etc.).

The body 12 includes an annular wall 30 that defines a cavity 32 dimensioned for the receipt of opposing ends of electrical conduits, as discussed in detail below. An opening 40 extends through the annular wall 30 and is contoured to define a first tab 50 that is cantilevered from one side of the opening 40. In the embodiment illustrated, the opening 40 has a substantially U-shaped appearance, and the first tab 50 is substantially parallel with the axis x and projects toward the first end 14 of the coupling 10. It is contemplated that the first tab 50 may project at another orientation (e.g., perpendicular to the longitudinal axis) and/or project toward the second end 16 of the coupling 10. It is also contemplated that the opening 40 and the first tab 50 may be simultaneously formed during a single stamping operation. Moreover, it is contemplated that the first tab 50 may have other shapes, for example, but not limited to, a curved or triangular shape, so long as the first tab 50 can be bent, as described in detail below.

Figure 10:
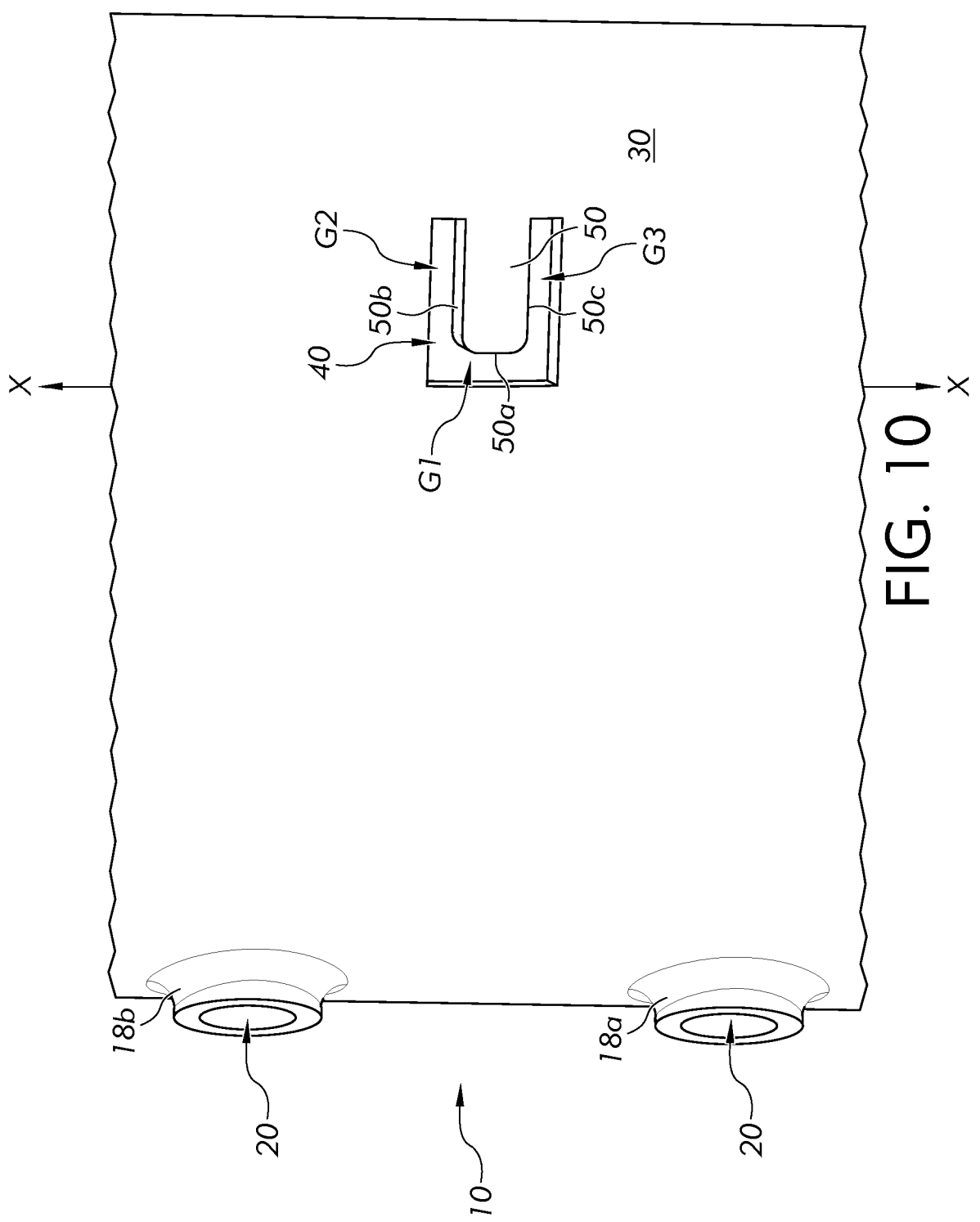
FIG. 10 is an enlarged view of a tab according to an alternative embodiment.

The first tab 50 includes a first edge 50*a*, a second edge 50*b*, and a third edge 50*c*. In the illustrated example, the first edge 50*a* extends in a direction substantially perpendicular to the axis x, and the second and third edges 50*b* and 50*c* extend in a direction substantially parallel to the axis x. It is contemplated that the first edge 50*a* may extend in a direction substantially parallel to the axis x, and the second and third edges 50*b* and 50*c* may extend in a direction substantially perpendicular to the axis x (FIG. 10), for example, if the first tab 50 projected into the opening 40 at another orientation (e.g., perpendicular to the longitudinal axis). It is also contemplated that the first edge 50*a* and the second and third edges 50*b* and 50*c* may extend in a direction other than 90°, for example, if the first tab 50 were skewed from the rear end 16 (FIG. 1) of the coupling toward a front end 14 (FIG. 1) thereof, or if the first tab 50 was oriented at another angle (e.g., other than 90°).

Returning to the illustrated example, the first edge 50*a* and the annular wall 30 define a first gap G1 therebetween, whereas the second and third edges 50*b* and 50*c* and the annular wall 30 define second and third gaps G2 and G3 therebetween, respectively. Preferably, the first gap G1 is dimensioned to receive a distal end of a tool 80 (FIG. 5) therethrough (e.g., a distal end of a screwdriver), while the second and third gaps G2 and G3 are dimensioned to allow a user to see into the cavity 32 of the coupling 10, as discussed below.

A plurality of first bosses 18*a* are formed on the annular wall 30 adjacent to the first end 14 of the coupling 10, and a plurality of second bosses 18*b* are formed on the annular wall 30 adjacent to the second end 16 of the coupling 10. Each boss 18*a*, 18*b* defines a threaded opening 20 extending into the cavity 32 and is dimensioned to receive a fastener 19 (e.g., a screw, a bolt, etc.). In the embodiment shown, there are two bosses on each side of the first tab 50. It is contemplated that there may be any number of bosses on each side of the first tab 50.

Figure 3:
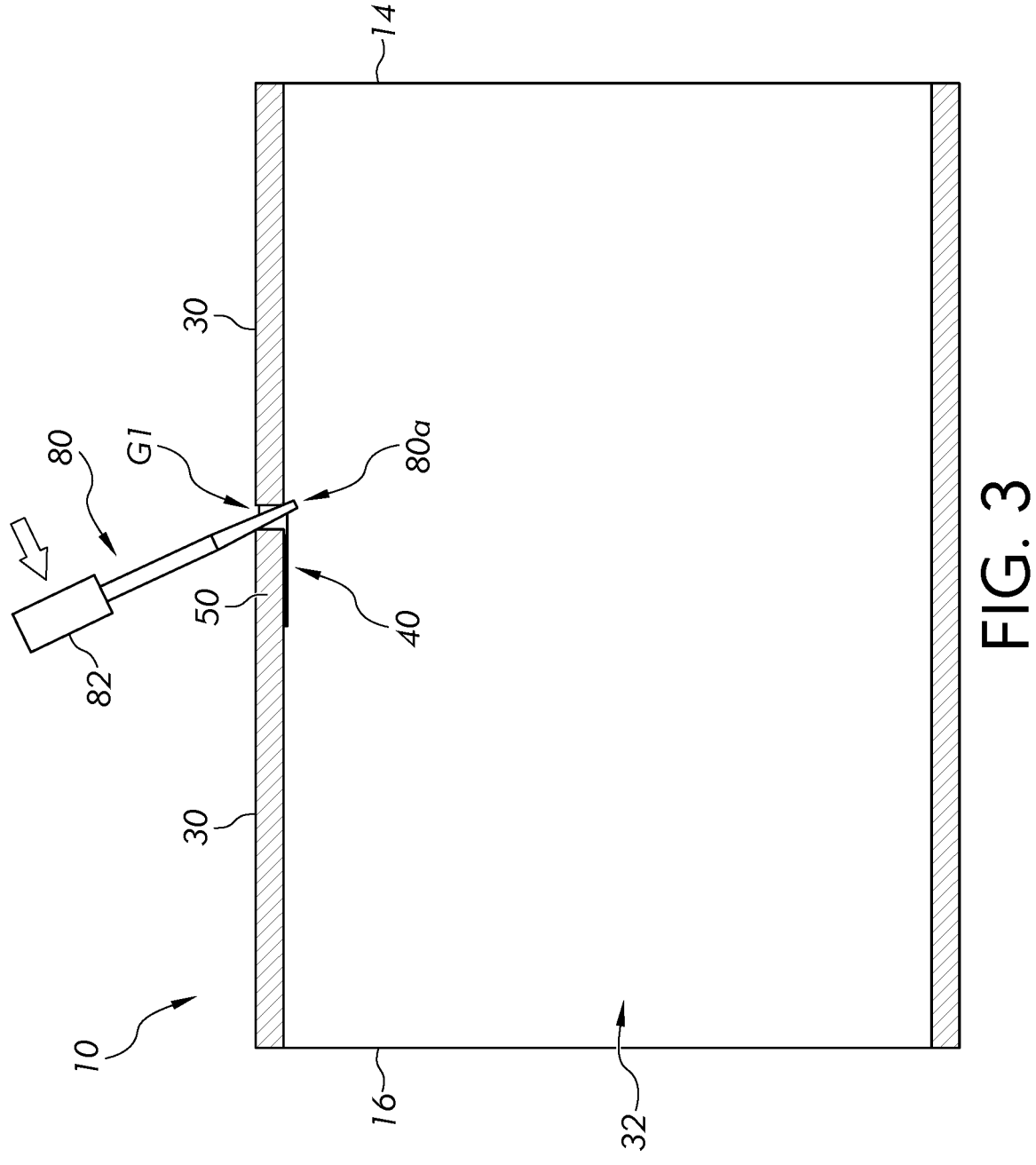
FIG. 3 is a section view of the coupling (taken along line A-A of FIG. 1) illustrating the tab in a first state and a tool engaging the tab for bending the tab from the first state to a second state.
Figure 4:
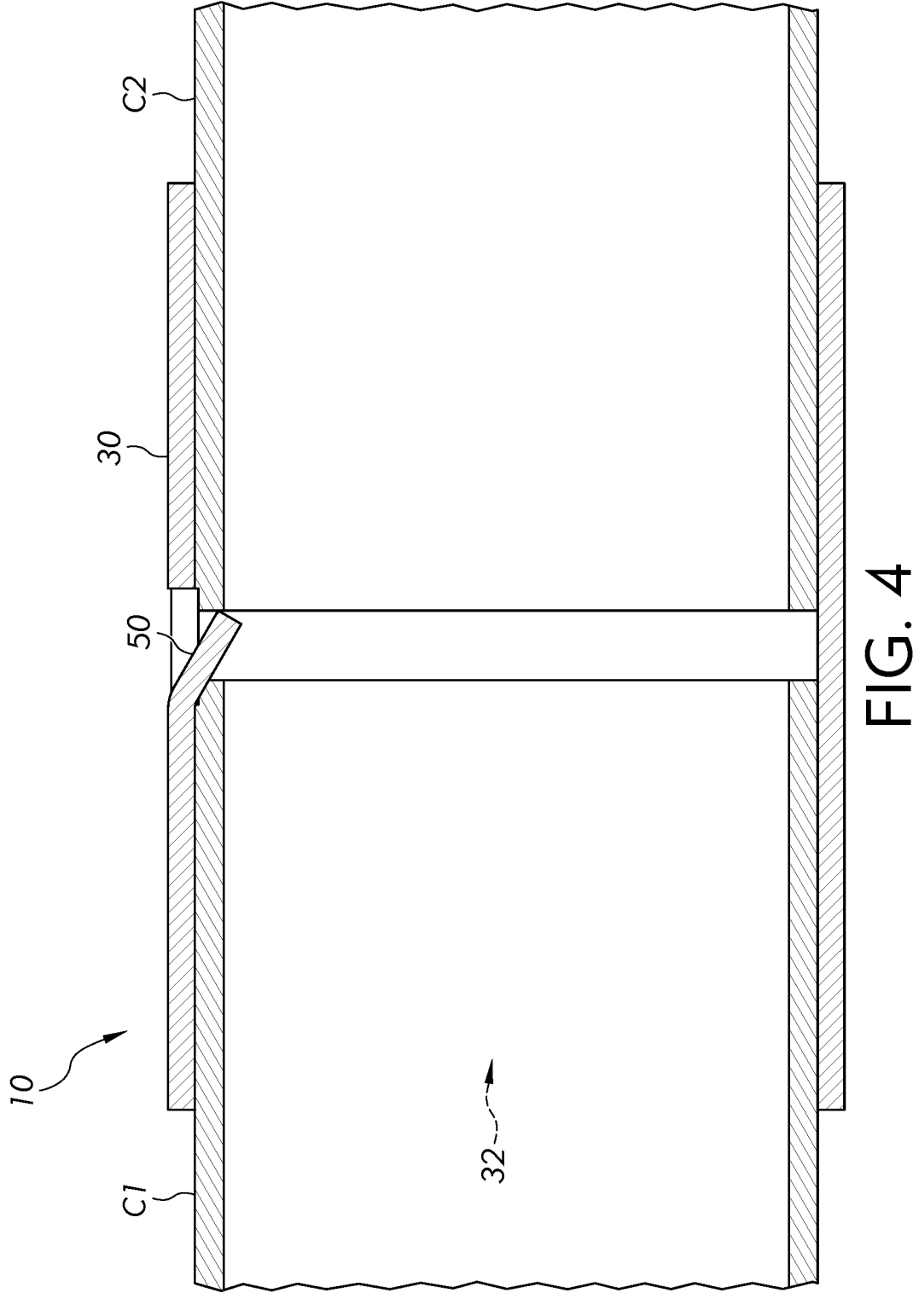
FIG. 4 is a section view of the coupling illustrating the tab in the second state.

Referring to FIGS. 3-4, the coupling 10 will now be described with respect to securing the coupling 10 to a conduit. A tool 80 (e.g., a flathead screwdriver) can initially be arranged such that a distal end 80*a* thereof is inserted through the first gap G1 at an acute angle relative to the first tab 50, thereby achieving the orientation shown in FIG. 3. In particular, the tool 80 is wedged between the first tab 50 and a side wall of the opening 40 such that the tool 80 pivots about the side wall of the opening 40 when a force is applied to the handle portion 82 of the tool 80. In the embodiment illustrated in FIG. 3, the tool 80 pivots in the counter-clockwise direction.

Pivoting the tool 80 (functioning as a lever) will cause the first tab 50 to bend into the cavity 32, thereby achieving the orientation shown in FIG. 4. In other words, the first tab 50 is adapted to deform between a first state (FIG. 3) and a second state (FIG. 4).

The requisite force to cause such deformation will vary depending on a variety of factors, for example, but not limited to, the length of the tool (e.g., the shaft thereof), the thickness of the first tab 50 and surrounding annular wall 30, the length of the first tab, etc. For example, a longer tool will require less force to deform the first tab 50 than a shorter tool (i.e., a mechanical advantage). Moreover, it should be understood that the orientation of the first tab 50 in the second state is selected to define a stop for the conduits C1, C2, as described in detail below. For example, it is contemplated that the first tab 50 may be bent to define a 90° angle relative to the annular wall 30, or somewhere between about 15° and 90° relative thereto.

With the first tab 50 bent into the cavity 32 (i.e., the second state), the first tab 50 will function as a stop of the coupling 10. In this state the coupling 10 will be suited to receive and connect opposing ends of conduits. For instance, conduits C1 and C2 may be inserted into the cavity 32 until opposing ends thereof engage the first tab 50, which will inhibit further insertion and provide tactile feedback to the user indicating the ends of the conduits are properly aligned, e.g., inserted into the coupling 10 at an appropriate depth. This alignment may be verified by looking into the cavity 32 via the first and second gaps G2 and G3 (FIG. 2) of the opening 40. In this respect, the gaps G2, G3 serve as viewing windows that allow a user to verify the placement of the conduits C1, C2 in the coupling 10. In this manner, the coupling which includes an opening defining the first tab 50 and the gaps G2, G3 can be considered a hybrid structure for providing two distinct functions, i.e., a stop and viewing windows. Lastly, fasteners 19 (FIG. 1) may be threaded into the mating bosses 18a and 18b (FIG. 1) such that the distal ends of the fasteners engage (are pressed against) the outer surfaces of the conduits C1 and C2 to secure the conduits C1, C2 in place.

Figure 5:
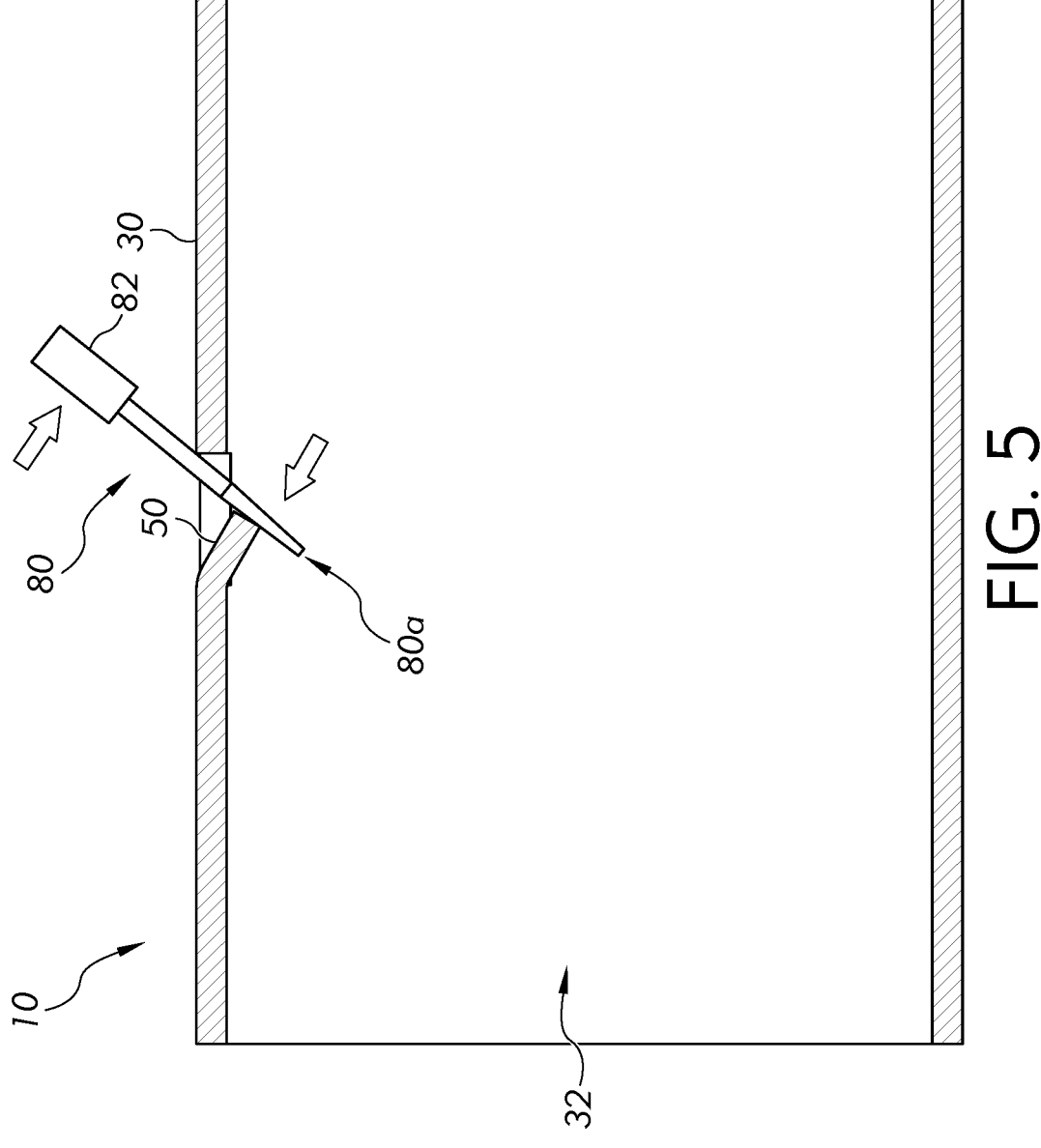
FIG. 5 is a section view of the coupling illustrating the tool engaging the tab for bending the tab from the second state to the first state.

In addition, due to its plasticity, the first tab 50 may be brought back to its initial configuration (i.e., to the first state), thereby making the coupling 10 reusable. For example, as shown in FIG. 5, the tool 80 can be positioned such that a distal end 80a thereof is inserted through the first gap G1 at an acute angle relative to the annular wall 30. In this configuration, the handle 82 can be pressed downward causing the distal end 80a of the tool 80 to pivot upwardly. This action will urge (deform) the first tab 50 back to its initial configuration, as shown in FIG. 3. As discussed above, a longer tool will provide a mechanical advantage, thereby decreasing the requisite force necessary to cause such deformation, as discussed above.

Figure 6:
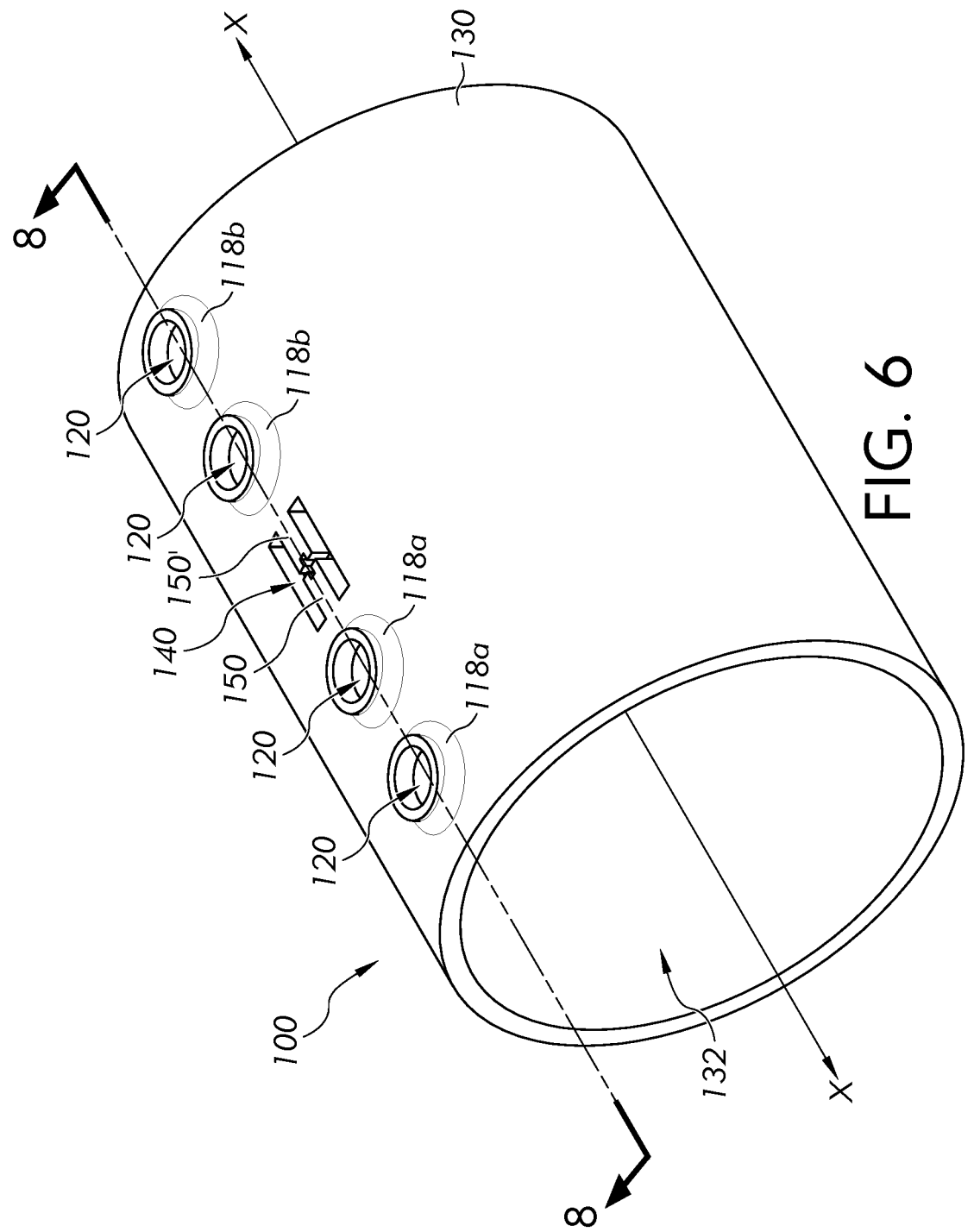
FIG. 6 is a perspective view of a coupling according to an alternative embodiment.
Figure 7:
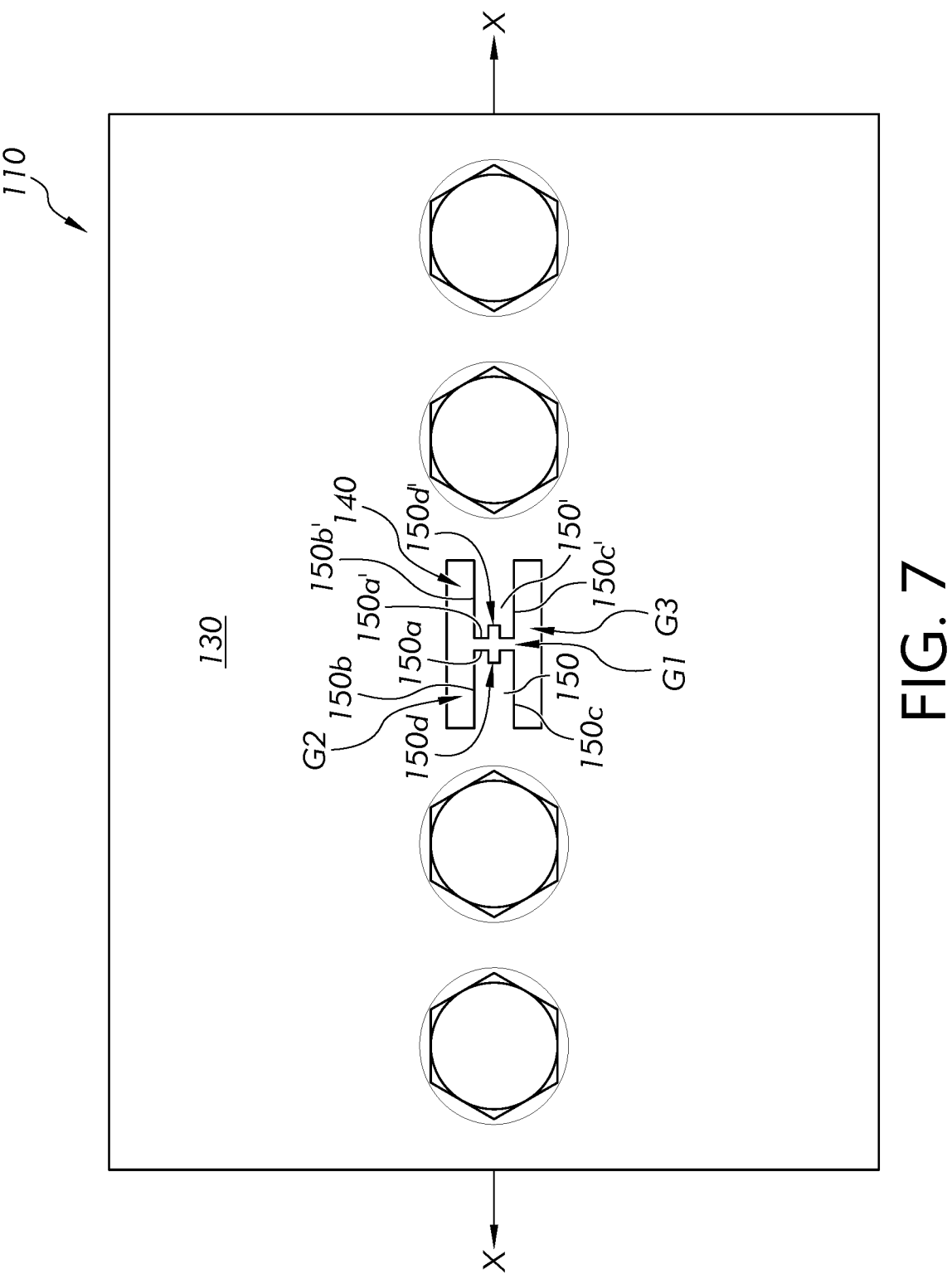
FIG. 7 is an enlarged view of opposing tabs of the coupling of FIG. 6.

Referring to FIGS. 6 and 7, a coupling 100 according to an alternative embodiment is shown. The coupling 100 shares similarities with the coupling of the first embodiment, and similar reference numbers will be used for similar features. Thus, a detailed description of similar features will not be provided for brevity.

Unlike the first embodiment, a pair of opposing tabs 150 and 150' project into an opening 140 from opposite walls thereof to give the opening 140 a substantially H-shaped appearance. Each tab 150, 150' includes a first edge 150a, 150a', a second edge 150b, 150b' and a third edge 150c, 150c', respectively. The first edges 150a, 150a' extend in a direction substantially perpendicular to the axis x, whereas the second and third edges 150b, 150b' and 150c, 150c' extend in a direction substantially parallel to the axis x. The first edges 150a, 150a' are spaced apart by a first gap G1 therebetween. Cutouts 150d may be formed in the first edges 150a to define engagement slots for receiving a distal end of a tool, as discussed below.

The second edges 150b, 150b' and the annular wall 130 define a second gap G2 therebetween, and the third edges 150c, 150c' and the annular wall 130 define a third gap G3 therebetween. As before, the second and third gaps G2 and G3 are dimensioned to allow the user to see into the cavity 132.

Figure 8:
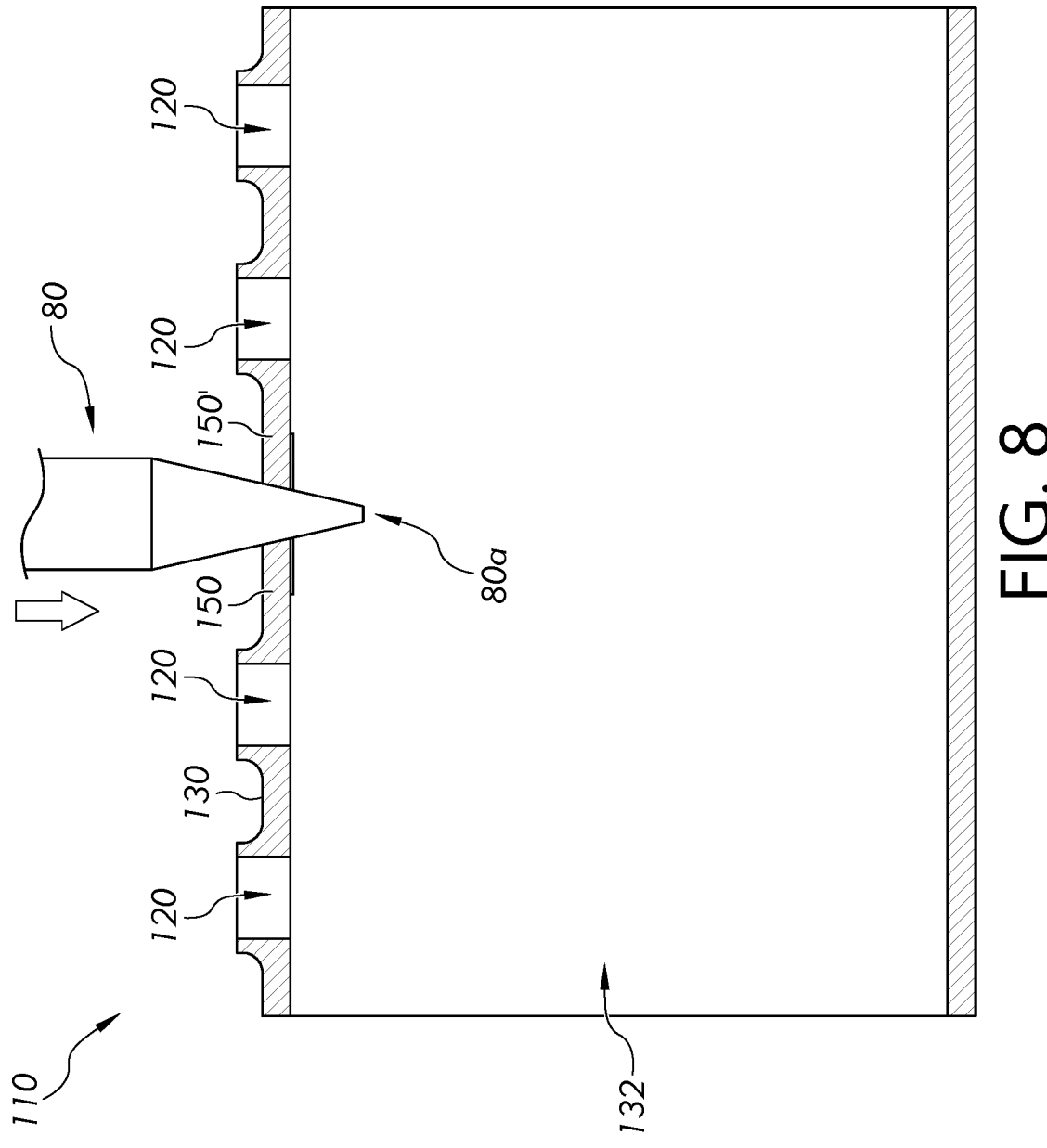
FIG. 8 is a section view of the coupling (taken along line B-B of FIG. 6) illustrating the opposing tabs in a first state and a tool engaging the opposing tabs for bending the tabs from the first state to a second state.
Figure 9:
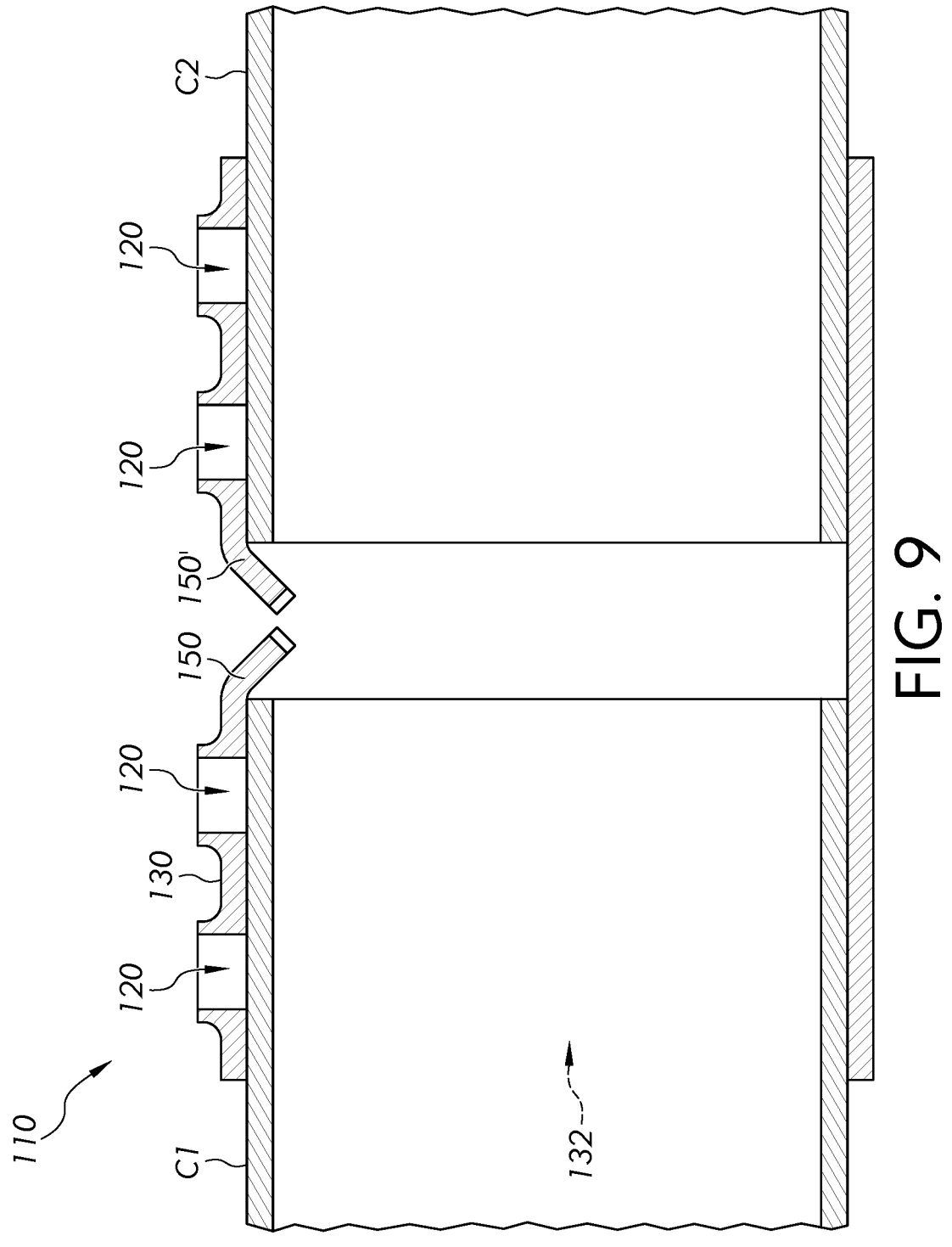
FIG. 9 is a section view of the coupling illustrating the opposing tabs in the second state.

Referring to FIGS. 8 and 9, the coupling of the second embodiment will now be described with respect to securing the coupling 10 to a conduit. The tool 80 can initially be arranged such that the distal end 80a thereof is brought into engagement against the opposing tabs 150, 150', thereby achieving the configuration shown in FIG. 8. In particular, the distal end 80a of the tool 80 may be brought into engagement with the cut-outs 150d, 150d' (FIG. 7) to prevent the tool 80 from slipping when applying a force thereto An inwardly (relative to an inner cavity of the coupling 100) directed force can then be applied to the tool 80. This force will cause the tabs 150 to bend into the cavity at an acute angle relative to the surrounding annular wall 130. In this configuration, each tab 150, 150' defines a stop such that conduits C1 and C2 may be inserted into the cavity 132 until opposing ends thereof engage the respective tabs 150, 150'. In this manner, the tabs 150, 150' will inhibit further insertion and provide tactile feedback to the user indicating the ends are properly aligned. As before, the user may verify this alignment by looking into the cavity 132 via the first and second gaps G2 and G3 (FIG. 6) of the opening 140, e.g., functioning as viewing windows. Lastly, fasteners (not shown) may be rotatably driven through the openings 120 of the bosses 118a and 118b (FIG. 6) such that distal ends of the fasteners are urged against (i.e., pressed against) the conduits C1 and C2 to secure the conduits C1 and C2 in place.

The present invention thus provides a coupling for coupling opposing ends of electrical conduits. The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims and their equivalents.

What is claimed is:

1. A coupling for coupling distal ends of first and second electrical conduits together, the coupling comprising:
   a body including an annular wall defining an internal cavity;
   an opening extending through the annular wall; and
   a first tab projecting into the opening in a first state, said first tab being adapted to deform between the first state and a second state;
   wherein the first tab, when in the second state, functions as a stop and is configured to engage the distal ends of the first and second conduits when inserted into the internal cavity to inhibit further insertion of the first and second conduits in the body.

2. The coupling of claim 1, wherein the body extends along a longitudinal axis, and wherein the first tab includes:
   a first edge extending in a direction substantially perpendicular to the longitudinal axis,
   a second edge substantially parallel to the longitudinal axis, and
   a third edge substantially parallel to the longitudinal axis, wherein the annular wall and the first edge define a gap therebetween.

3. The coupling of claim 1, wherein the body extends along a longitudinal axis, and wherein the first tab includes:
   a first edge extending in a direction substantially parallel to the longitudinal axis,
   a second edge substantially perpendicular to the longitudinal axis, and
   a third edge substantially perpendicular to the longitudinal axis, wherein the annular wall and the first edge define a gap therebetween.

4. The coupling of claim 2, wherein the annular wall and the second and third edges respectively define viewing windows of the coupling.

5. The coupling of claim 1, the coupling further comprises:

a plurality of bosses disposed on the annular wall, each boss defining a threaded opening; and a plurality of fasteners each rotatably engaged with the threaded opening of each of the plurality of bosses, respectively, each fastener being extendable into the internal cavity.

6. The coupling of claim 1, wherein the coupling includes a second tab projecting into the opening in a first state, said second tab being deformable from the first state to a second state.

7. The coupling of claim 6, wherein the first tab and the second tab each define a cutout for engagement with a tool.

8. A method of coupling distal ends of electrical conduits together, the method comprising:

providing the coupling of claim 1, a first conduit, and a second conduit;

deforming the first tab to the second state;

inserting a distal end of the first conduit into the internal cavity such that the distal end is brought into engagement with the first tab; and inserting a distal end of the second conduit into the internal cavity such that the distal end is brought into engagement with the first tab.

9. The method of claim 8, the method further comprises securing the coupling to the conduits via removable fasteners.

10. The method of claim 8, wherein the method further comprises:

inserting a distal end of a tool at an acute angle relative to the first tab into the opening; and pivoting the tool to deform the first tab from the first state to the second state, wherein in the second state the first tab is bent inwards into the internal cavity of the body.

11. The method of claim 8, wherein the method further comprises:

removing the conduits from the internal cavity; and deforming the first tab from the second state to the first state, wherein in the first state the first tab is parallel with the annular wall of the body.

12. The method of claim 11, wherein the method further comprises: inserting a distal end of a tool at an acute angle relative to the annular wall into the opening; and pivoting the tool to deform the first tab from the second state to the first state, wherein in the second state the first tab is bent inwards into the internal cavity of the body.

13. The method of claim 8, wherein the method further comprises sliding the first conduit through the internal cavity before deforming the tab to the second state.

14. A method of coupling electrical conduits, the method comprising:

providing a coupling defining an internal cavity and an opening extending through a wall thereof, wherein the coupling includes a first tab and a second tab extending into the opening from opposing sides thereof, the first and second tabs being deformable from a first state to a second state;

providing a first conduit and a second conduit;

deforming each of the first and second tabs from the first state to the second state; inserting an end of a first conduit in the internal cavity such that the end is brought into engagement with one of the first or second tabs; and inserting an end of a second conduit in the internal cavity such that the end is brought into engagement with another of the first or second tabs.

15. The method of claim 14, wherein the method further comprises securing the coupling to the conduits via removable fasteners.

16. A coupling for coupling distal ends of two electrical conduits together, the coupling comprising:

a body including an annular wall defining an internal cavity;

an opening extending through the annular wall;

a first tab projecting into the opening in a first state, said first tab being adapted to deform between the first state and a second state; and a second tab projecting into the opening in a first state, said second tab being deformable from the first state to a second state.

17. The coupling of claim 16, wherein the first tab and the second tab each define a cutout for engagement with a tool.

18. The coupling of claim 1, wherein in the second state, the first tab is bent inwards into the internal cavity of the body.

19. The method of claim 14, wherein in the first state, the first and second tabs project into the opening, and wherein in the second state the first and second tabs are bent inwards into the internal cavity.

20. The coupling of claim 16, wherein in the second state, the first and second tabs are bent inwards into the internal cavity of the body.

* * * * *